United States Patent [19]

Hennequin

[11] Patent Number: 4,641,122

[45] Date of Patent: Feb. 3, 1987

[54] DEVICE FOR MEASURING THE LEVEL OR VOLUME OF LIQUID IN A TANK

[75] Inventor: Yves Hennequin, La Celle St. Cloud, France

[73] Assignee: Jaeger, France

[21] Appl. No.: 692,058

[22] Filed: Jan. 16, 1985

[30] Foreign Application Priority Data

Jan. 17, 1984 [FR] France .................. 84 00648

[51] Int. Cl.⁴ .......................................... H01L 10/14
[52] U.S. Cl. ....................................... 338/33; 73/453; 73/317
[58] Field of Search .................... 338/33; 73/317, 314, 73/451, 453, 454

[56] References Cited

U.S. PATENT DOCUMENTS

| | | | |
|---|---|---|---|
| 2,442,630 | 6/1948 | Wickesser | 338/33 X |
| 2,575,616 | 11/1951 | De Giers et al. | 338/33 X |
| 2,718,784 | 9/1955 | Brake | 73/317 |
| 2,728,226 | 12/1955 | Vanderberg et al. | 73/317 |

FOREIGN PATENT DOCUMENTS

| | | |
|---|---|---|
| 1269815 | 6/1968 | Fed. Rep. of Germany . |
| 926564 | 10/1947 | France . |
| 2425631 | 12/1979 | France . |
| 413414 | 12/1966 | Switzerland . |

*Primary Examiner*—E. A. Goldberg
*Assistant Examiner*—M. M. Lateef
*Attorney, Agent, or Firm*—Handal & Morofsky

[57] ABSTRACT

The present invention relates to a device for detecting the level of liquid in a tank. The device comprises a level detector formed of two arms pivoted on a common fixed support about first, respectively parallel, generally horizontal axes and a movable support member carrying a float adapted to follow the level of the liquid, the support member being pivoted on the two arms about second axes respectively spaced from but generally parallel to the first axes, in order that on change of level of the liquid the float follows a curved path determined by the combined pivoting of the arms, the float cooperating with a transducer adapted to generate a signal representing the position of the float.

12 Claims, 3 Drawing Figures

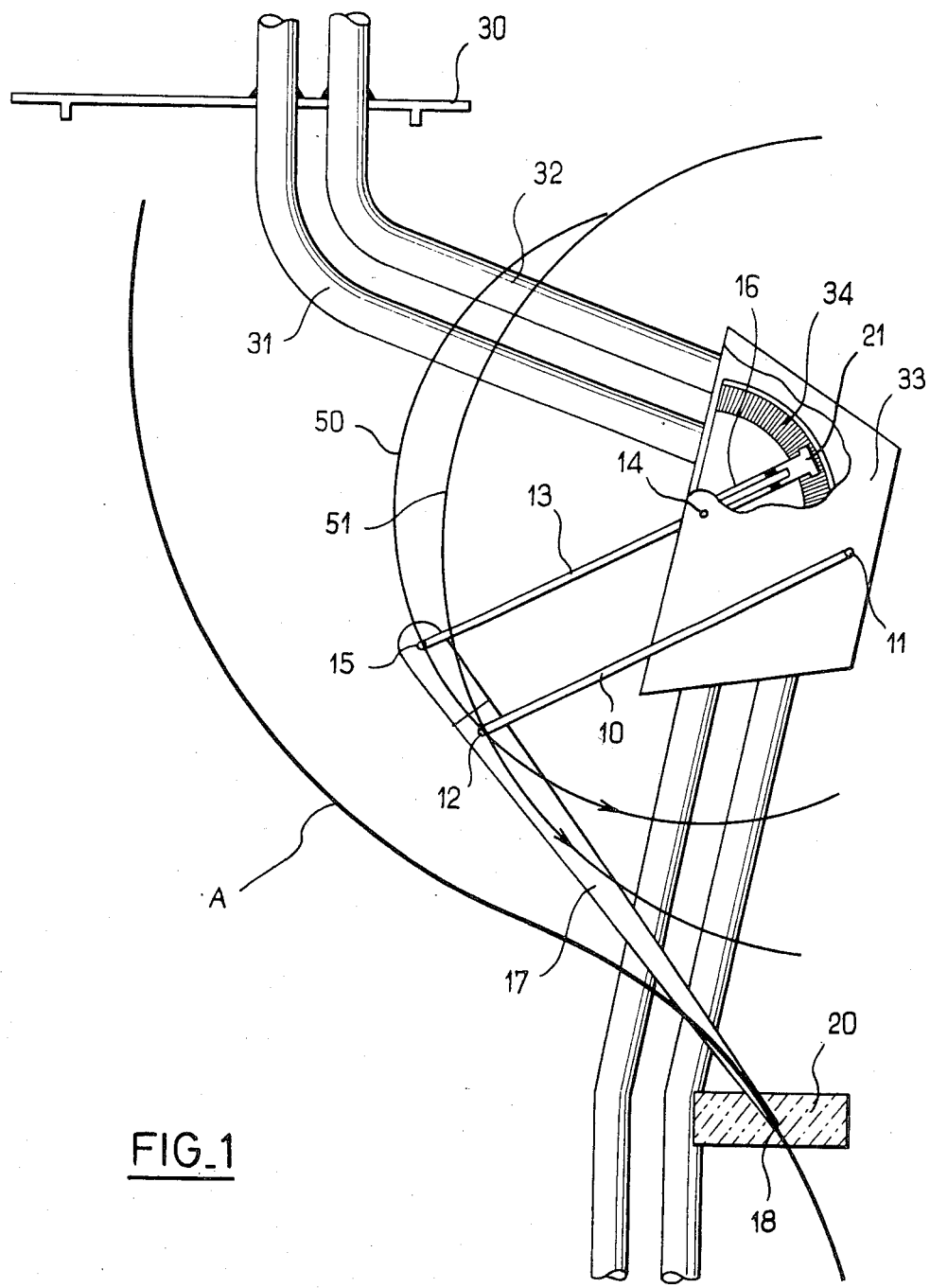
FIG_1

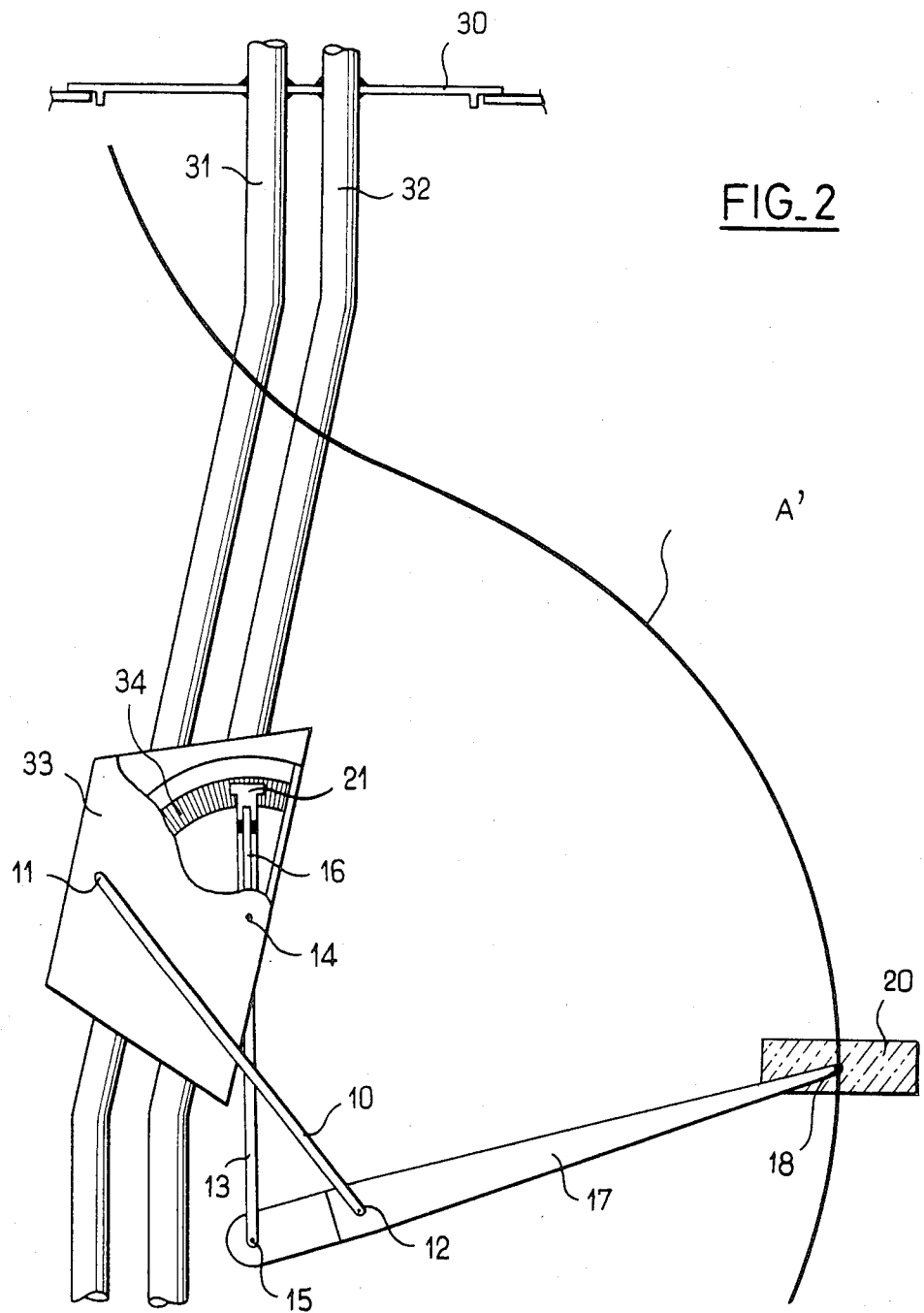
FIG_2

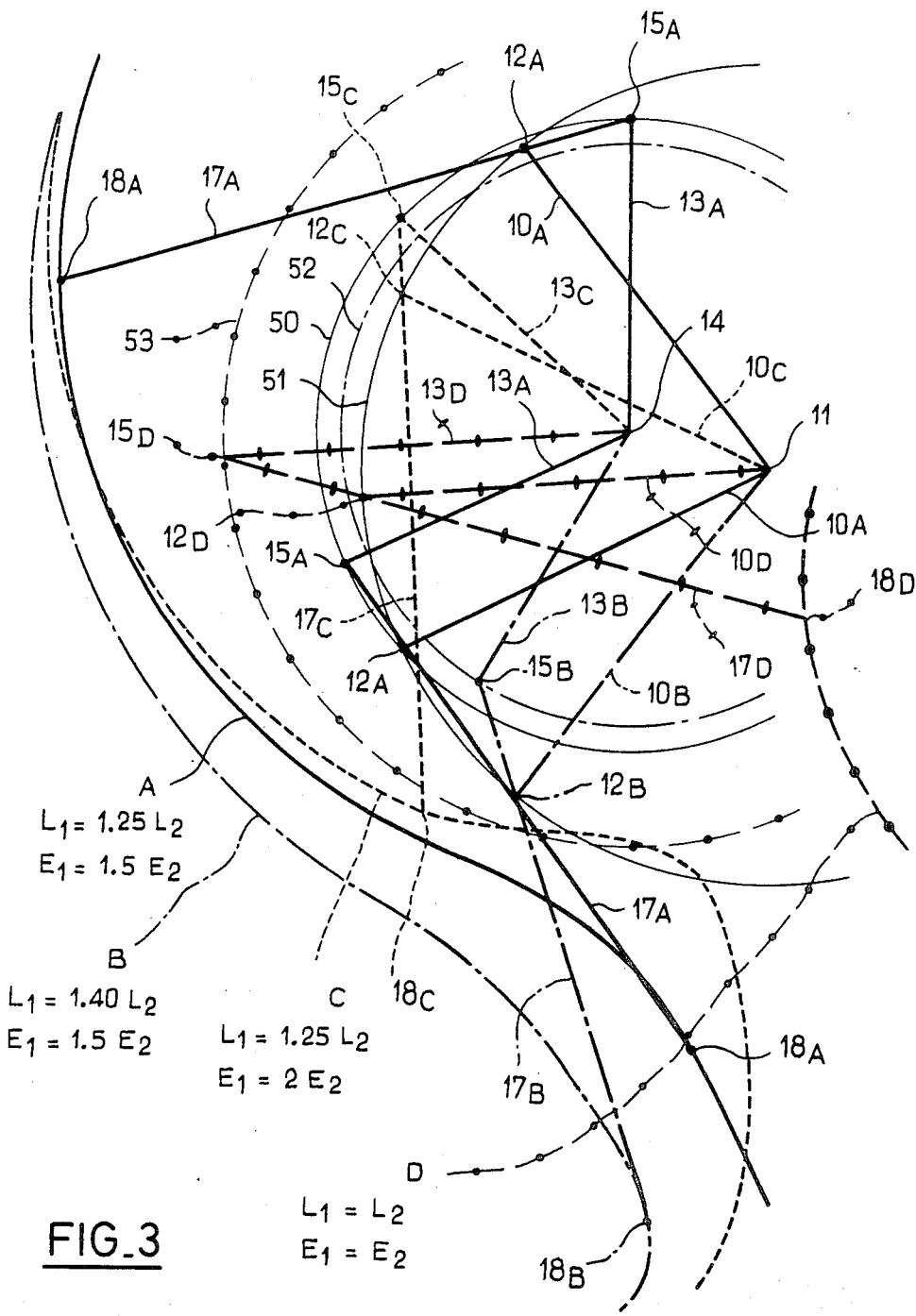
FIG_3

DEVICE FOR MEASURING THE LEVEL OR VOLUME OF LIQUID IN A TANK

TECHNICAL FIELD

The present invention relates to measurement of the level or, indeed, the volume of a liquid, such as a fuel, or a lubricant, contained in a tank or casing.

BACKGROUND

Level measuring devices are already known which comprise a level detector provided with a float movable along a vertical or inclined trajectory, but not horizontal, for following the level of the liquid, and a transducer sensitive to displacement of the float, such as a rheostat connected via its sliding contact to the float and connected to processing and measuring means, for determining a level indication as a function of the position of the float.

However, particularly in the case of fuel tanks carried by a vehicle, the fuel level fluctuates greatly as a result of movement of the vehicle.

In addition, level detectors are generally very sensitive to fluctuations in the level of the liquid.

In an attempt to limit the effect of liquid level fluctuations on a detector having a float, it has been proposed to arrange the latter in a generally vertical tube communicating with the tank via a nozzle. Nevertheless this proposal is not entirely satisfactory.

In particular, when the tank has a complex geometry, that is to say when the cross section of the tank taken in a horizontal plane is not constant, as is the case in automobiles in order to best utilize the available space, it is not always possible to provide such tubes extending throughout the entire height of the tank.

In addition, the use of these tubes pose service problems which are difficult to resolve. It is in fact a delicate operation to obtain access to the interior of the tank when dirt blocks the nozzle or disturbs the displacement of the float in the tube.

The present invention now proposes a new construction which overcomes these inconveniences.

SUMMARY OF THE INVENTION

As will be explained below, the present invention is particularly but not exclusively applicable to tanks or casings having complex geometry, that is to say, as already set out, tanks or reservoirs in which the horizontal cross section is not constant.

For this, the present invention proposes a device for detecting the level of liquid in a tank of the type having a level detector provided with a float movable to follow the level of the liquid and cooperating with a transducer adapted to generate a signal representing the position of the float. The level detector has, according to the invention, two arms pivoted on a common fixed support, about first respectively parallel, generally horizontal axes; and a movable support member carrying the float and pivoted on the two arms, about second axes respectively spaced from but generally parallel to the first axes, so that on change of level of the liquid, the float follows a curved path determined by the combined pivoting of the arms. In accordance with an advantageous feature, one of the arms is extended away from the second axis with respect to the associated first axis provided on the fixed support by a wiper element acting on a resistive element forming the transducer.

According to the curvature of the path required, the respective distances separating the first and second axes of each of the arms can be equal or not.

Similarly, the spacing separating the first axes associated with the fixed common support can be equal or not to the spacing separating the second axes associated with the movable support member.

According to another advantageous characterstic, the support member comprises a longeron pivoted on the arms about the second axes and carrying the float spaced from them. Preferably, the float is carried pivotally free on the support member.

According to an advantageous variant, the device comprises a member for adjusting the distance separating the first and second axes of one at least of the arms.

Further, the device preferably comprises at least one member for adjusting the separation between the first axes associated with the fixed common support or the second axes associated with the movable support member.

According to another important characteristic, the arms are able to cross.

Advantageously, the device is adapted to impose on the float a curved path following the curve of minimum fluctuation of the liquid. By curve of minimum fluctuation of the liquid is intended a curve substantially determined by the centre of symmetry of each horizontal cross section of the tank or casing containing the liquid of which the level is wished to be measured.

BRIEF DESCRIPTION OF DRAWINGS

Other characteristics and advantages of the present invention will appear from reading the following detailed description and on studying the accompanying drawings, which are provided by way of non-limitative example, and in which:

FIG. 1 diagrammatically shows a device according to the invention for detecting the level of liquid, FIG. 2 diagrammatically illustrates a variant of the device shown in FIG. 1, and FIG. 3 illustrates the result of adjustment on the distance separating the first and second axes of an arm, or on the value of the separation between the first or second axes, FIG. 3 showing for this four curves obtained with different values of these distances and separations.

DESCRIPTION OF THE PREFERRED EMBODIMENT

In FIGS. 1 and 2 will be seen a fixing plate 30 assembled removably or not to a tank or casing containing the liquid whose level is to be measured. This fixing plate 30 carries two tubes 31,32, corresponding, for example, to the fuel feed and return tubes and on which is fixed a support 33 which is below termed the common fixed support.

It should be noted that the common fixed support 33 could be fixed by any other functionally equivalent means at the interior of the tank or casing containing the liquid. Further, the geometry of the tubes 31,32 or the members carrying the common fixed support can take any other appropriate form.

In addition, FIGS. 1 and 2 show two arms 10,13 pivoted on the common fixed support 33 about respectively parallel generally horizontal first axes 11,14 which are perpendicular to the plan of FIGS. 1 and 2.

Further, a movable support member 17 carrying the float 20 is pivoted on the two arms 10,13 about second axes 12,15 respectively spaced from and generally parallel to the first axes 11,14, so that on change in the level of the liquid the float follows a curved path (referenced curve A and curve A' respectively in FIGS. 1 and 2) determined by the combined pivoting of the arms 10 and 13.

The curvature of the curved path of the float will be more precisely explained below.

In addition to the level detector provided with a movable float 20 for following the level of the liquid, which has been described, the liquid level detection device according to the invention comprises a member sensitive to the displacement of the float and adapted to generate a signal representing the position of the float 20.

In this case, the sensitive member is formed by a rheostat.

More precisely, the rheostat is comprised of a resistive element 34 and a wiper 21 in contact with it, provided on one of the arms 13 carrying the movable support 17.

Again more precisely, the arm 13 is extended away from the second axis 15 with respect to the first associated axis 14 provided on the common fixed support 33, by an arm 16 aligned with the arm 13, and carrying at its free end, opposite from the second axis 15 the mentioned wiper 21, which is in contact with the resistive element 34.

The structure and nature of the wiper 21 can take any appropriate form in accordance with the structure and nature of wipers generally used for potentiometers or rheostats.

The said signal representative of the position of the float 20 is obtained by measuring the electrical resistance between the wiper 21 or arm 16 (electrically conducting for this) and one of the ends of the resistive element 34. Connection wires not shown in the figures are provided for this.

It will be noted that the wiper 21 moves on a semi-circular path centred on the axis 14. As a result of this, the resistive element 34 has a corresponding semi-circular form centred on the axis 14.

If necessary, the wiper can be provided between the axes 14 and 15 on the arm 13 or in a comparable manner on the arm 10.

In accordance with an advantageous variant, the resistive element is formed as a resistive track carried by an insulating support, itself fixed in an envelope held to the common fixed support 33.

In addition, in accordance with the embodiment shown in FIGS. 1 and 2, the support member 17 which carries the float 20 is formed as a longeron pivoted on the arms 10,13, about the second axes 12 and 15. The longeron extends away from the second axis 15 with respect to the axis 12, in alignment of the separation between these, and carries the float 20 at its free end opposite from the second axis 15. The float is thus spaced from the second axes 12,15.

Preferably, the float 20 is carried pivotally free on the longeron 17 about an axis 18 parallel to the first axes 11,14 and to the second axes 12,15.

Further, as is shown for example in FIG. 2, in order to permit significant displacement of the float on the curved path shown by the curves A and A', the arms 10,13 are preferably adapted to be able to cross. This signifies in particular that the arms 10,13 are disposed in different pivoting planes (planes perpendicular to the axes 11,14, 12 and 15). At the same time, the length of the axes, (considered perpendicular to the plane of the Figures,) and the geometry of the longeron 17 are consequentially arranged. For example, as concerns the longeron 17, it will be noted that the end of it pivoted on the arm 13, that is to say the end opposite from the float 20, must be arranged out of the pivoting plane of the second arm 10, in order to permit crossing of the arms 10,13 during displacement of the float 20.

In FIG. 1 the line 50 shows the circular displacement path, centred on the axis 14, of the pivot axis 15 provided between the arm 13 and the longeron 17.

On the same FIG. 1, the curve 51 shows the circular path centred on the axis 11 of the pivot axis 12 provided between the arm 10 and the longeron 17.

The curve referenced A in FIG. 1 shows the curved path of the axis 18 corresponding to the pivot point between the float 20 and the longeron 17.

The curvature of this curve A is determined on the one hand by the distances separating the first and second axes of each of the arms 10,13, and on the other hand by the spacing provided between the first axes 11,14 and the spacing provided between the second axes 12,15.

For simplifying the explanations below with respect to the curvature of the path imposed on the float 20 by the arms 10,13, the distance separating, on the arm 10, the first axis 11 and the second axis 12 will be called L1, the distance separating, on the arm 13, the first axis 14 and the second axis 15 will be called L2; the separation between the first axes 11,15 will be called E1, and the separation between the second axes 12,15 will be called E2.

In the embodiment shown in FIG. 1, L1=1.25 L2 and E1=1.5 E2.

From this, in considering the path (curve A) of the float 20, from the upper part of the tank (adjacent the fixing plate 30) to the bottom of the tank the curve A can be split into a first (upper) section concave in the direction of the common fixed support 33 and a second (lower) section convex in the direction of the common fixed support 33.

The first upper section concave in the direction of the common fixed support is obtained when a segment connecting the second axes 12,15 moves, considering the second axis 12 as the origin, in the anti-clockwise direction.

On the other hand, the second portion of the path of the float, convex in the direction of the common fixed support 33 is obtained when the segment connecting the second axes 12,15 moves, considering the second axis 12 as the origin, in a clockwise direction.

It should be noted, as a result, that the point of inflection on the curve A is obtained on the change of direction of pivoting of the separation 12 to 15 with respect to the axis 12.

It will be noted that in the embodiment shown in FIG. 2, in a manner similar to that shown in FIG. 1, L1=1.25 L2 and E1=1.5 E2. At the same time, the modification obtained in the curvature of the path of the float 20 is due to a reversal of 180°, of the mechanism in the plane perpendicular to the pivot axes 11,12,14 and 15 (parallel to the plane of the Figure). The embodiment shown in FIG. 2 will not be described in more detail. In order to explain the result of adjustments to the values L1, L2 and E1,E2 on the curvature of the path of the float 20, four curves A,B,C and D corresponding to four different cases have been superimposed in FIG. 3.

Also shown in FIG. 3 is the position occupied by the corresponding detector, that is to say the arms 10,13 and the longeron 17 in one or more points of each of these paths. The references used for identifying the arms 10,13 and the longeron 17 as well as the different associated pivot axes will be indicated with references previously mentioned in respect of FIGS. 1 and 2, always, in order to distinguish the four superimposed cases, these references will be provided with an index A,B,C or D according to the case considered.

The curve A corresponds to the case described with respect to FIG. 1, that is to say L1=1.25 L2 and E1=1.5 E2.

The path described by the axis 18A of the float is shown by the curve A in a full line. Also, the arms $10_B$ and $13_A$ as well as the associated longeron $17_A$ are shown in full lines at two different points on the path. The curves described by the second axes $12_A, 15_A$ are shown by circular curves in full lines referenced respectively 51,50 and centred on the axes 11,14. These curves are the same as those shown on FIG. 1.

The curve B represents in chain dotted lines the path of the axis $18_B$ of the float corresponding to the case where L1=1.40 L2 and E1=1.5 E2. Only the value L2 is modified with respect to the first case A. The arms $10_B, 13_B$ and the corresponding longeron $17_B$ are also shown chain dotted. The paths of the axes $12_B, 15_B$ are illustrated by circular curves 51,52 respectively traced as full lines and chain dotted lines, centred on the axes 11,14.

The curve C represents in dashed lines the case corresponding to L1=1.25 L2 and E1=2 E2. Only the spacing E2 is modified with respect to the first case A. Also the arms $10_C, 13_C$ as well as the corresponding longeron $17_C$ are shown with dashed lines. The ratio between the values L1 and L2 being similar to that held for the curve A, the paths of the axes $12_C, 15_C$ again correspond respectively to the circular curves in full referenced 51,50, centred on the axes 11,14.

Finally the curve D represented in dotted interrupted lines corresponds to the case where L1=L2 and E1=E2, the values L1 and E1 being identical to the values held in the first case A. It will be noted that in this fourth case the two arms $10_D, 13_D$ define a regular parallelogram. These arms $10_D, 13_D$ and the associated longeron $17_D$ are also shown as dotted broken lines.

The path of the axis $12_D$ is shown by the circular curve traced in a full line under the reference 51, whilst the path of the pivot axis $15_D$ is shown by the circular curve traced in broken dotted lines referenced 53 and centred on the axis 14.

The curve A has already been described particularly in respect of FIG. 1.

By comparison, it will be noted that the curve D corresponds to a circular path since the displacement of the pivot axis $18_O$ between the float and the longeron $17_D$ is similar to the displacement of the axes $12_D, 15_D$ which themselves follow a circular path.

The curves A and B will now be compared. It will be noted that the ratio of the interaxial separations is not modified for these two cases; on the other hand, in the case B, the length L2 is shortened whilst the length L1 remains unchanged. This does not introduce a fundamental modification in the upper part of the path of the float. However, in the lower part, the action of the arm 13 on the second axis 15 disposed at the free end of the longeron 17 intervenes more rapidly in the case B, when the arm $13_B$ is shortened.

The curves A and C will now be compared. The values L1 and L2 for these cases are identical. However, in the case C the separation E2 between the pivot axes $12_C, 15_C$ is reduced with respect to the case A, with the separation E1 remaining unchanged.

From this again, the influence of this modification on the upper portion of the path is negligible.

On the other hand, in the lower portion of the curve, the shortening of the interaxial separation E2 accentuates the convexity of the path in modifying the pivoting of the segment $12_C-15_C$ of which the ends follow, it should be noted, the curves 50,51.

In practice, the particular structure taken by the detector, that is to say in particular the values given to the segments L1,L2,E1 and E2 will be defined by the man skilled in the art for imposing on the float 20, and more particularly the connection axis 18 between itself and the longeron 17, a curved path following the curve of minimum fluctuation of the liquid, that is to say as previously described the centre of symmetry of horizontal cross-sections of the container.

For this, the man of the art may adopt different solutions.

One of these consists of choosing amongst a certain number of charts representing different curves for which the parameters LI,L2,E1 and E2 are varied, the path nearest to that sought.

Another solution consists in proceeding to a simulation on a computer of the path imposed on the free end of the longeron 17 for various values of L1,L2,E1 and E2 until obtaining a path coinciding with the path sought.

A third solution consists in using a prototype on which are provided adjustable elements adapted to modify the distance separating the first and second axes of at least one of the arms 10,13, and preferably the separation between the first axes associated with the common fixed support 33 or the second axes associated with the movable support member 17 or longeron.

After overall definition of the parameters L1,L2,E1 and E2 permitting approximation of the curve sought, the man of the art will modify with precision the value of these parameters by use of adjusting elements for approaching the best curve.

It will be noted in addition, that the adjusting elements (not shown in the drawings) can equally be provided on the devices intended to be permanently installed, in order, for example, to compensate errors in mounting or positioning of the pivot axes.

These adjusting elements can be effected for example in the form of a screwed member.

It should equally be noted that the adjustment of the parameters L1 and L2 can be obtained by bending to a greater or lesser extent the arms 10,14, in order to bring together the pivot axes 11,12 on the one hand and 14,15 on the other hand.

It should be noted that the embodiments here described are susceptible of various modifications conforming with the invention.

I claim:

1. In a device for detecting the level of liquid in a tank having a level provided with a movable float for following the level of liquid and cooperating with a transducer adapted to generate a signal representative of the position of said float, the improvement comprising:
   (a) a common fixed support,
   (b) two first parallel and approximately horizontal axial supports provided on said common fixed support, (c) two arms mounted for pivoting movement on said common fixed support, respectively about said first axial supports, (d) two second parallel axial supports spaced from but generally parallel to said two first axial supports, provided respectively on said two arms, (e) a movable support member mounted for pivoting movment on said two arms respectively about said second axial supports, and (f) a float mounted on said movable support member.

2. A detection device according to claim 1 wherein a portion of one of said arms extends beyond its respective first axial support and opposite to its respective second axial support and further comprising:

(g) a wiper element secured to said extended portion; and (h) a resistive element, said wiper element acting on said resistive element and forming said transducer therewith.

3. A device according to claim 1, wherein the distance separating the first axial support and second axial support of one of said arms differs from the distance separating the first axial support and second axial support of said other arm.

4. A device according to claim 1, wherein the respective distances separating said first axial support and said second axial support of each said arms are equal.

5. A device according to claim 1, wherein the separation between said two first axial supports is equal to the separation between said two second axial supports.

6. A device according to claim 1, wherein the separation between said two first axial supports differs from the separation separating said two second axial supports.

7. A device according to claim 1, characterized by the fact that said support member comprises a longeron pivoting on said arms about said two second axial supports and carrying said float spaced from them.

8. A device according to claim 1, characterised in that said float is carried pivotally free on said support member.

9. A device according to claim 1 further comprising means for adjusting the distance separating the first axial support and second axial support of at least one of said arms.

10. A device according to claim 1, comprising at least one element for adjusting the separation between two first axial supports, associated with said common fixed support, or said two second axial supports associated with said movable support member.

11. A device according to claim 1, wherein said arms are adapted to be able to cross.

12. A device according to claim 1, wherein a curved path imposed on said float follows the curve of minimum fluctuation of the liquid.

* * * * *